United States Patent
Nakhjiri et al.

(10) Patent No.: US 8,555,361 B2
(45) Date of Patent: Oct. 8, 2013

(54) DYNAMIC CRYPTOGRAPHIC SUBSCRIBER-DEVICE IDENTITY BINDING FOR SUBSCRIBER MOBILITY

(75) Inventors: Madjid F. Nakhjiri, San Diego, CA (US); Katrin Hoeper, Arlington Heights, IL (US); Alexander Medvinsky, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 78 days.

(21) Appl. No.: 13/036,139

(22) Filed: Feb. 28, 2011

(65) Prior Publication Data
US 2011/0213969 A1    Sep. 1, 2011

Related U.S. Application Data

(60) Provisional application No. 61/308,879, filed on Feb. 26, 2010.

(51) Int. Cl.
*G06F 21/00* (2013.01)

(52) U.S. Cl.
USPC ........ 726/7; 726/3; 726/5; 713/158; 713/171; 380/247; 455/411; 709/229

(58) Field of Classification Search
USPC .................................................... 726/2, 6, 7
See application file for complete search history.

(56) References Cited

U.S. PATENT DOCUMENTS

| | | | |
|---|---|---|---|
| 7,194,763 B2 | 3/2007 | Potter et al. | |
| 7,231,203 B2 * | 6/2007 | Marcelli | 455/411 |
| 7,319,757 B2 * | 1/2008 | Kumar | 380/247 |
| 7,546,632 B2 | 6/2009 | Stieglitz et al. | |
| 7,707,405 B1 * | 4/2010 | Gilman et al. | 713/156 |
| 7,793,336 B2 * | 9/2010 | Salowey et al. | 726/2 |

(Continued)

FOREIGN PATENT DOCUMENTS

| | | |
|---|---|---|
| EP | 1739903 A1 | 1/2007 |
| EP | 1873668 A1 | 1/2008 |

(Continued)

OTHER PUBLICATIONS

PCT Search Report & Written Opinion, RE: Application #PCT/US2011/026465; Jun. 9, 2011.

(Continued)

*Primary Examiner* — Morshed Mehedi

(57) ABSTRACT

A method of authentication and authorization over a communication system is provided. The method performs a first authentication of a device based on a set of device identity and credentials. The first authentication includes creation of a first set of keying material. The method also includes performing a second authentication of a subscriber based on a set of subscriber identity and credentials. The second authentication includes creation of a second set of keying material. A set of compound key material is created with a key derivation mechanism that uses the first set of keying material and the second set of keying material. A binding token is created by cryptographically signing at least the device identity authenticated in the first authentication and the subscriber identity authenticated in the second authentication using the set of compound keying material. The signed binding token is exchanged for verification with an authenticating and authorizing party.

40 Claims, 4 Drawing Sheets

(56) References Cited

U.S. PATENT DOCUMENTS

| | | | |
|---|---|---|---|
| 7,979,899 | B2 | 7/2011 | Guo et al. |
| 2004/0177369 | A1* | 9/2004 | Akins, III .................. 725/31 |
| 2005/0210251 | A1 | 9/2005 | Hyberg et al. |
| 2006/0155822 | A1 | 7/2006 | Yang et al. |
| 2007/0112967 | A1* | 5/2007 | Lee et al. .................. 709/229 |
| 2007/0143614 | A1 | 6/2007 | Holtmanns et al. |
| 2008/0022389 | A1* | 1/2008 | Calcev et al. ............... 726/14 |
| 2008/0108322 | A1 | 5/2008 | Upp |
| 2008/0127317 | A1* | 5/2008 | Nakhjiri ..................... 726/6 |
| 2009/0031131 | A1* | 1/2009 | Qiu et al. ................... 713/172 |
| 2009/0031138 | A1* | 1/2009 | Nakhjiri ..................... 713/181 |
| 2009/0193247 | A1 | 7/2009 | Kiester et al. |
| 2009/0300744 | A1* | 12/2009 | Guo et al. .................. 726/7 |
| 2009/0328147 | A1 | 12/2009 | Goel et al. |
| 2010/0217982 | A1* | 8/2010 | Brown et al. ............... 713/168 |
| 2011/0302646 | A1* | 12/2011 | Ronda et al. ............... 726/9 |
| 2011/0314287 | A1 | 12/2011 | Escott et al. |
| 2012/0023559 | A1* | 1/2012 | Dietrich et al. ............ 726/6 |

FOREIGN PATENT DOCUMENTS

| | | |
|---|---|---|
| EP | 1881665 A1 | 1/2008 |
| WO | 02/093824 A2 | 11/2002 |
| WO | 03/001736 A1 | 1/2003 |
| WO | 2005/093544 A1 | 10/2005 |

OTHER PUBLICATIONS

Yu-Tso Chen, et al, "NET 27-3—Combining TLS and TPMs to Achieve Device and User Authentication for Wi-Fi and WiMAX Citywide Networks", Wireless Communications and Networking Conference; pp. 2804-2809; Mar. 31, 2008.

"Configuring EAP-PEAP & EAP-TTLS for a Radius Server", Solutions for Securing Wireless and Wired Networks, Interlink Networks LLC, 2007. URL: http://www.interlinknetworks.com/app_notes/eap-peap.htm, downloaded Feb. 7, 2011.

Linux Knowledge Base and Tutorial, "802.1X Port-Based Authentication HOWTO", URL: http://www.linux-tutorial.info/modules.php?name=Howto&pagename=8021X-HOWTO/int . . . , Downloaded Feb. 7, 2011.

Wright, S. et al., "IPTV Device and Authentication Identity Interoperability Specification", Alliance for Telecommunications Industry Solutions: ATIS, 2007.

Coleman, David, et al. "CWSP: Certified Wireless Security Professional Official Study Guide", pp. 147-148, 2010.

"Network Access Control: User and Device Authentication", Intel Information Technology, Computer Manufacturing Enterprise Security, Aug. 2005.

Siddharth, Bajaj, et al., "A Vision for Browser-Assisted Web Authentication", W3C Identity in the Browser Workshop, Symantec Corporation, Apr. 29, 2011.

* cited by examiner

DYNAMIC CRYPTOGRAPHIC SUBSCRIBER-DEVICE IDENTITY BINDING FOR SUBSCRIBER MOBILITY

RELATED APPLICATIONS

This application claims priority from U.S. provisional application No. 61/308,879, filed Feb. 26, 2010, which is incorporated by reference herein in its entirety.

BACKGROUND

Conditional access systems (CAS) protect high value content from unauthorized viewing by encrypting the content stream prior to distribution. Access control to the content is enforced by providing the content decryption keys only to authorized devices. Traditionally, the association of a device to a subscriber has been static, meaning that following completion of subscription contracts with a service provider (SP), the SP provides a device (e.g., a set top box) to the subscriber, which may be installed at the subscriber's permanent location. In this way a permanent subscriber-device relationship (binding) can be configured at the service provider data bases and CAS servers, distributor head end and streaming equipments. During this configuration, a device's identity and credentials would be added to the list of devices authorized to receive content decryption keys.

With advances in mobile computing and networking technologies as well as new trends in consumer behaviour new demands are being placed on the content supply chain: content needs to be available from any source, including traditional distributor networks, the Internet and wireless networks. The business models interacting with the consumer are also expanding: A subscriber with a business contract with a service provider (SP) may wish to view the subscribed content on devices other than her home set top (e.g. a mobile phone), or at locations other than her home, e.g. on a set top in a hotel or a friend's house. The subscriber may also wish to view content on demand, either from her service provider catalogue or from a $3^{rd}$ party Internet sources.

Support for the aforementioned supply chain and business models go beyond the traditional mechanisms in which a manufacturer simply provides a database of device identifier and keys to the operator and the operator then binds the device identity to the subscriber who received the device. If the subscriber has acquired the device through retail channels, the SP may have no a priori knowledge of the device or the fact that the device will be used by this particular subscriber. Furthermore, with the growing list of types of devices that can render content, the SP may have no information about the device's fitness (e.g., robustness properties and other capabilities) for rendering content on the device without risking the content owner's business interest. Another issue that complicates the scenario is that each of these devices may obtain network connectivity/packet transport through a different access technology or a separate network provider (NP) and it is desirable for the details of network connectivity to be transparent to the SP authorization and CAS processes.

Given that the business contract is typically between a subscriber and a SP, the authorization to view content needs to be enforced by a trust relationship that is built based on subscriber profile (subscriber identity, credentials, subscription profile). However, since the content needs to be delivered to and decrypted by the device, the distribution of content and content decryption keys needs to take into account the device characteristics such as device identity, private keys, and robustness profile (i.e., the ability of a device to protect valued assets such as content and keys as required by owners and distributors).

The above requirements place new demands on SP security procedures: The SP needs to not only authorize the subscriber based on the underlying business model and subscription profile, but also ensure that the content is consumed (or equivalently, ensure that content decryption keys are obtained) only on a device that is properly associated to that authorized subscriber for the particular content that is to be consumed and only for the period of time during which the authorization is provided. The SP must also ensure that such transport is not threatened by passive eavesdropping of the keys, or redirection of the keys to unintended devices. This means that the SP needs to not only authenticate the device that the subscriber is currently using, but also ensure that an authorized subscriber is actively present at the device and is not being impersonated by service/content thieves.

From the Digital Rights Management perspective, it is also important for the SP to know the level of robustness with which the device can store and execute sensitive material related to the distributed content so the SP can avoid the risk of piracy.

Another design consideration is that subscriber authentication today is based on cryptographically weak methods and credentials, such as passwords and 4 digit PINs. Such authentication credentials and methods, if not adequately protected, may not only jeopardize the consumer's privacy (e.g., location, identity) but also lack non-repudiation mechanisms that leave both the consumer and SP vulnerable to service theft. For instance, a system that actively involves the subscriber in the authorization process denies the subscriber the ability to dispute a previously consumed service (e.g. a movie watched) while at the same time protecting the consumers from having to pay for content consumed by others. An active and dynamic binding of subscriber and device credentials could provide indisputable evidence that the subscriber participated in the transaction. Thus the overall mechanism should be such that subscriber credentials are protected from tampering and eavesdropping.

It may also be desirable for the security procedures to provide the option of fast re-authorizations, so that a subscriber does not have to go through the lengthy authentication and binding process after having paused or interrupted the connection. For instance, subscribers should be able to access their services on a device in a hotel room with little delay during the entire period of 24 hours after having paid for 24 hours of service.

Finally, in Internet-type architectures, authorization and authentication is typically performed by a AAA server, which has nothing to do with the content distribution. The content distribution and rights management are typically performed by DRM/CAS systems that can be independent of the SP authorization system and which are often provided by third party suppliers. Thus, the result of an authentication and binding process as described above needs to be communicated to a CAS. Currently such interfaces between the AAA server and CAS systems are not available.

EAP-TTLSv0, which is described in RFC5281, provides a method that allows a client to first establish a tunnel with a server (typically based on server-only authentication) and then authenticate itself using weak authentication mechanisms/credentials which are delivered to the server through the tunnel (this is called inner authentication). EAP-TTLS also allows clients to perform multiple inner authentications using different sets of credentials. EAP-TTLSv0 does not bind the tunnel protocol to the inner authentication method (s), nor does it bind the multiple inner authentications to each other. In addition, multiple inner authentications can only authenticate the same entity, meaning that the client is from a cryptographic point of view one and the same entity. EAP-TTLSv0 provides session resumption using the native TLS mechanism with unprotected session IDs. Due to its lack of method bindings and single client nature, EAP-TTLS does not provide any adequate subscriber-device binding.

PEAPv0 and EAP-FAST provide similar tunnelling mechanisms. Both methods further provide a cryptographic binding between the tunnel and the inner authentication(s) by creating dependencies in the derivation of session keys. In particular, keys from tunnel and inner authentications are combined to derive MAC keys used in the remainder of the session and to generate the Master Session Key (MSK). Similar to EAP-TTLSv0, PEAPv0 and EAP-FAST both provide session resumption per TLS abbreviated handshake. In addition, EAP-FAST supports session resumption using protected access credentials in the form of tokens. Still none of PEAPv0 and EAP-FAST can bind the authentications of two different entities to a tunnel and, thus, cannot provide an adequate subscriber-device binding.

None of the previously mentioned authentication and authorization methods treats the device and the subscriber as two separate entities. Rather, in these methods the client is the same entity who performs multiple layers of authentications using different credentials. They do not take into account the situation where a device can have its own identity/certificate while the user (e.g., a subscriber) is a human with a different identity/credential pair. That is, known techniques do not take address those cases where the device and subscriber may have a physically, logically and cryptographically loose existence.

SUMMARY

In accordance with one aspect of the invention, a method of authentication and authorization over a communication system is provided. The method performs a first authentication of a device based on a set of device identity and credentials. The first authentication includes creation of a first set of keying material. The method also includes performing a second authentication of a subscriber based on a set of subscriber identity and credentials. The second authentication includes creation of a second set of keying material. A set of compound key material is created with a key derivation mechanism that uses the first set of keying material and the second set of keying material. A binding token is created by cryptographically signing at least the device identity authenticated in the first authentication and the subscriber identity authenticated in the second authentication using the set of compound keying material. The signed binding token is exchanged for verification with an authenticating and authorizing party.

In accordance with another aspect of the invention, a network-enabled device is provided for use in a communication system. The device includes a first component configured to engage in a first authentication exchange to authenticate the device based on a set of device identity and credentials. The first authentication exchange includes creation of a first set of keying material. A second component is configured to engage in a second authentication exchange to authenticate a subscriber based on a set of subscriber identity and credentials. The second authentication exchange includes creation of a second set of keying material. A third component is configured to create a set of compound key material with a key derivation mechanism that uses the first set of keying material and the second set of keying material. A fourth component is configured to create a binding token by cryptographically signing at least one of the device identity authenticated in the first authentication and the subscriber identity authenticated in the second authentication using the set of compound keying material. A communication interface is configured to exchange the signed binding token for verification with an authenticating and authorizing party.

In accordance with another aspect of the invention, an authentication and authorization arrangement is provided with includes a first authentication server configured to authenticate a device based on a set of device identity and credentials. The arrangement also includes a second authentication server configured to authenticate a subscriber based on a set of subscriber identity and credentials. The second authentication server is configured to verify a binding token created by cryptographically signing at least one of the device identity authenticated in the first authentication and the subscriber identity authenticated in the second authentication using a set of compound keying material derived using a first set of keying material created during authentication of the device and a second set of keying material created during authentication of the subscriber.

DETAILED DESCRIPTION

As detailed below, an authentication and authorization technique is provided in which a subscriber X is using a device Y to request a (e.g., subscription) service S at time T.

Figure 1:
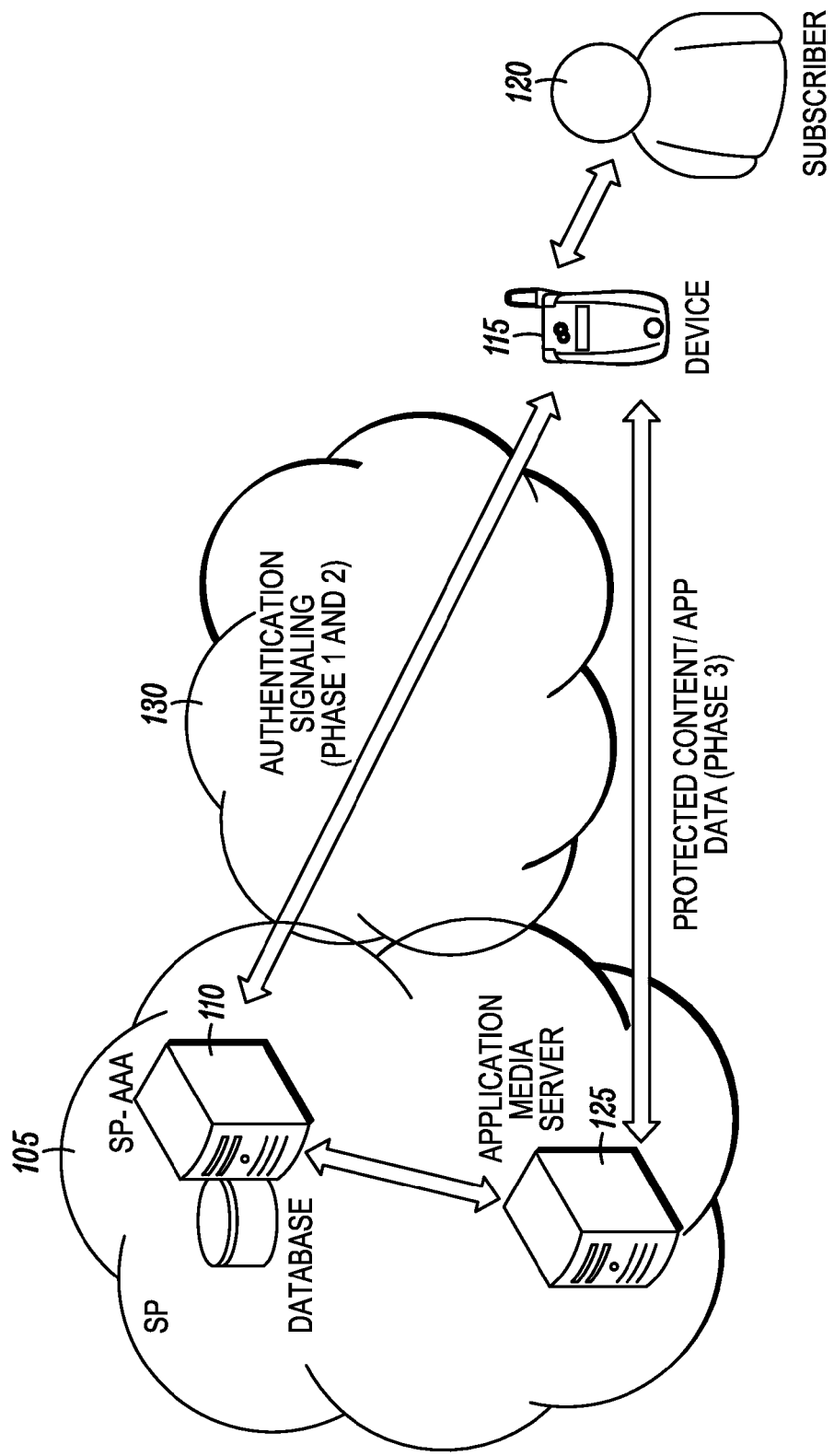
FIG. 1 shows one example of an operating environment in which the authentication and authorization processes described herein may be implemented.

FIG. 1 shows one example of an operating environment in which the authentication and authorization processes described herein may be implemented. A service provider 105 performs authentication and authorization functions, typically using a Service Provider Device Authentication Authorization and Accounting server (SP-AAA) 110. The SP-AAA 110 may be divided into two components, one for authenticating and authorizing devices such as device 115 and one for authenticating and authorizing subscribers such as subscriber 120. The component which authenticates and authorizes the device may be referred to as a SP-device AAA (SP-DAAA) and the component which authenticates and authorizes subscribers may be referred to as a subscriber AAA (SP-SAAA). In some implementations the SP-DAAA and SP-SAAA may be separated logically and even physically. In these implementations the two components will need to communicate through robust and secure channels (e.g. IPsec/TLS) and share sensitive data to make their separation transparent to the device 115. For convenience, the following description will refer to both components as an SP-AAA, as if they were in one and the same physical and logical devices, except in those cases where a separation of the two functions requires special handling.

After performing the authentication and binding process described below, the SP-AAA can provide evidence of the actions which were performed to an application server 125. In this way the application server 125 can in turn perform its function (e.g., delivering a service) based on the assumption that it is dealing with an authenticated and authorized device/subscriber pair. In a general case, the application server 125 may be a server that provides application services to the device/subscriber pair. For example, the application service may deliver Electronic Program Guide (EPG) data, a gaming service, Internet based video services, and so on. In one particular implementation, the application server 125 may be a CAS/DRM server that provides conditional access services, such as providing rights and licenses to devices and providing content encryption keys to servers that stream encrypted content to authorized devices.

Device 115 is generally indicative of a wide variety of network-enabled devices and is not intended to suggest any limitation as to the scope of use or functionality of the system(s) and methods described herein. For example, device 115 may be a consumer electronic device such as a mobile phone, a personal digital assistant, a personal computer, a personal media player, a computer/television device, a set-top box, a hard-drive storage device, a video camera, a DVD player or another type of known or later developed electronic device. Device 115 communicates with service provider 105 over communications network 130. Communication network 130 may be any suitable network such as, for example, a Wireless Wide Area Network (WWAN), WiMax, 3GPP, terrestrial or a satellite transmission network, and/or a landline transmission network, such as a Wide Area Network (WAN), DSL, fiber or cable network.

Overview

Figure 2:
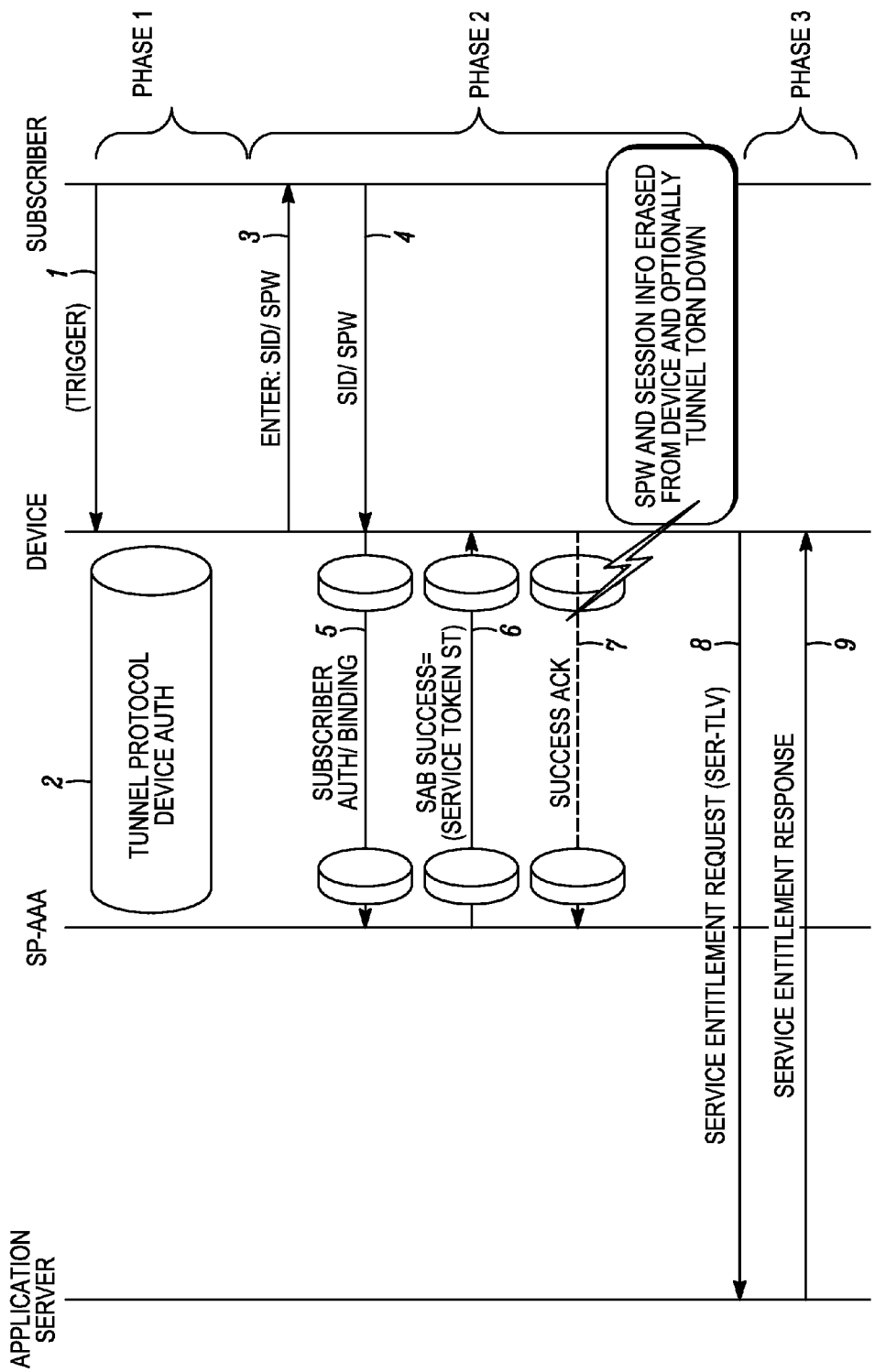
FIG. 2 is a message flow diagram showing an overview of the authentication and authorization process.

FIG. 2 is a message flow diagram showing an overview of the authentication and authorization process. The process can be divided into three phases, each of which will be discussed in more detail below. The process begins at 1 when a subscriber decides to use a service from the service provider, e.g. watch content. This action on the part of the subscriber serves as a trigger to start the process. The trigger may be, for example, a selection of content from a menu available on the device.

Following the trigger indicating the subscriber's intent to request a service and the discovery of adequate Service Provider (SP) information, the device engages in an authentication exchange with the SP-AAA (or with the SP-DAAA in those implementations where the S-DAAA and the SP-SAAA are separate entities). This authentication exchange is represented by 2 in FIG. 2 and occurs in phase 1. The result of phase 1 is the establishment of a set of credentials that prove the device has been authenticated by the SP-AAA. It some implementations a secure tunnel may also be established in phase 1, which protects the signaling messages communicated during phase 2.

After the secure tunnel is established (if employed), phase 2 begins. The main functions of phase 2 are subscriber authentication and binding of a device identity and a subscriber identity. As indicated at 3 in FIG. 2, the subscriber may receive an indication from the device that she needs to enter her identity/password and any other credentials that are given to the subscriber, which the subscriber provides at 4. The term password as used herein is used in its most generic sense to represent any credentials (e.g., one time passwords, secure tokens, etc) that are given to the subscriber so that subscriber can prove her identity to the SP.

As part of the subscriber authentication process, the device uses the subscriber credentials to create data that the SP-AAA (or the SP-SAAA if they are separate) can use to compare with its database and verify the authenticity of the subscriber. As part of this process a set of credentials will be generated that are considered as proof that the subscriber is now also authenticated. The device now creates a signed binding Token (the binding token is also referred to herein from time to time as a binding blob, which refers to data located in a message field). The binding token contains the device identity, the subscriber identity and possibly other data. Example of such additional data could be a device security robustness profile, subscriber service profile, and any other data needed for the authorization process.

The binding token (blob) is signed using a signing key that draws from the set of credentials created in phase 1 and the set of credentials created from the subscriber authentication. The device sends the binding blob to the SP-AAA at 5, which now needs to verify the blob data and signature. If the SP-DAAA and SP-SAAA are separate, knowledge of the credentials from the two phases of the process needs to be shared between them. It is generally preferred, however, that the two functions be performed within the same physical or logical cryptographic boundary to protect the integrity of the entire process. Once the verification is complete, the SP-AAA creates a service token (ST) and at 6 sends it to the device as an indication that the authentication and authorization is complete. The token is typically signed by the SP-AAA and may include specific details regarding specific services and even servers that the device need to interact with. The token may include restrictions such as a validity period, etc. The token may also be encrypted. Phase 2 ends when the device sends an acknowledgement message to the SP-AAA at 7. If a secure tunnel is employed, it may be torn down at this point.

Phase 3 largely deals with cases where the device presents the service token to an application server and, as indicated at 8, requests the desired service. In examining the service token, the application server is relying on the SP-AAA as a source of trust that the device-subscriber pair has in fact been authenticated and that the binding is valid under any restrictions that may be expressed in the token. In some cases the device may need to perform additional functions before presenting the service token to the application server. For instance, in the case where the application server is a CAS/DRM server and the device-SP-ID and device-DRM-ID are different, the device may have to re-sign the ST to provide a binding between those two identities. In another (more secure) alternative, the SP or a device manufacturer shares a list of device-SP-ID to device-DRM-ID mappings for all involved devices with the DRM/CAS server as part of an out-of-band process. Such a list of mappings could be created in a factory where devices are being manufactured and loaded with their cryptographic identities. In yet another alternative, a single device digital certificate may include both the device-SP-ID and device-DRM-ID. If the service token has been encrypted, the application server needs to go back to the SP-AAA for verification of the token. In such cases, the service token may include the identifier and/or location (e.g. URI) of the SP-AAA in the clear, so that the application server knows how to refer to the SP-AAA for decryption and verification of the token. It is also possible that the token is uniquely encrypted for the application server, if the SP-AAA was aware of what application was being requested at the time of the authorization request and was aware of a workable encryption mechanism. For instance the SP-AAA may share an encryption key with the application server, or has knowledge of an application server public key to encrypt the token uniquely for the application server or group of application servers. Finally, phase 3 ends at 9 when the application server sends a service entitlement response to the device indicating whether the subscriber is authorized for receipt of the requested service on that device.

Phase 1

In some implementations the device performs a mutual authentication process in which both the device and the SP-AAA use public key pairs and digital certificates issued by Certificate Authorities (CA) who are directly or indirectly trusted (via a certificate chain) by the entities associated with the owner of the certificate. The certificate includes the identity of the entity they are representing, which will be referred to herein as the cert-ID.

The device certificate used in this authentication process may include a so-called device-SP-ID as the cert-ID, i.e. a device identity that is recognizable by the services involved and which is later bound to the subscriber identity. Given that many CAS/DRM systems issue device certificates under their own licensing terms, it is possible that the device possesses two certificates (one from the SP and one from the CAS entity), each of which includes a different device identity. That is, the device-SP-ID may be different from the device-DRM-ID, i.e. the device identity provided in the certificate issued by the CAS/DRM vendor. As described below in connection with phase 3, a binding may be provided between these two device identities.

The SP-DAAA and SP-SAAA may share a common certificate or they may have individual certificates. For the purpose of phase 1, the SP-DAAA server cert-id is referred to as the SP-ID. The SP-ID may include an affiliation to the service provider (e.g., @mylovelyoperator.com) and could include a particular server ID (e.g., a fully qualified domain name: FQDN).

As previously mentioned, in some implementations the device authentication process may employ a tunnel that is created using a mutually authenticated key establishment protocol based on public keys. The public keys from the device and the SP-DAAA certificates are used for this purpose as described above. The tunnel protocol derives keys that are used to provide encryption and integrity-protection (Message Authentication Code, or MAC key) for the following messages (e.g. phase 2 messaging). Examples of suitable protocols that may be employed to establish the tunnel include Transport layer Security (TLS) and IKE.

In addition to the freshly derived encryption and MAC keys, a Tunnel Proof Key (TPK) may also be derived to prove that the device is authenticated and is located at one end of the tunnel In some cases a Tunnel Resumption Key (TRK) may also be derived. The TRK enables expedited session resumption. The key derivation functions may be similar to those used in TLS RFCs such as RFC 4346 or 5246, where first a TLS master key is generated and then a key block is generated from that master key. It is also possible to perform a further iteration of the pseudo random function (PRF) to simply generate the TPK and TRK directly (as shown below in a1, a2 and a3), A second alternative is to leave the process of TLS key block derivation as defined in RFCs undisturbed (to generate the initial key block as shown in b1, b2, and b3) and then, after the initial key block (key_block_1) is generated, perform a separate round of the PRF just for the purpose of creating the TPK and TRK (as shown below in b4 and b5). The latter alternative may be advantageous because it does not disturb the process of TLS implementations that are widely available. One example of the steps that may be performed to create the aforementioned keys is as follows:

a1. derive master_secret=PRF(pre_master_secret, "master_secret", client_random||server_random)
a2. derive key_block=PRF(master_secret, "key expansion", server_random||client_random)
a3. partition key_block=TPK||client_write_MAC_key||server_write_MAC_key||client_write_ENC_key||server_write_ENC_key||[TRK]
b1. derive master_secret=PRF(pre_master_secret, "master_secret", client_random||server_random)
b2. derive key_block1=PRF(master_secret, "key expansion", server_random||client_random)
b3. partition key_block1=client_write_MAC_key||server_write_MAC_key||client_write_ENC_key||server_write_ENC_key
b4. derive key_block2=PRF(master_secret, "proof key generation", server_random||client_random)
b5. partition key_block2=TPK||[TRK]
where the symbol || denotes concatenation.

The order of the keys in the partitioning of step a3 and b5 is irrelevant, provided that both device and server agree on the order The TPK and TRK have lifetimes that are assigned by the SP-AAA as TPK-LT and TRK-LT, respectively, which can be communicated to the device at some point or simply derived from the lifetimes for the session based on SP policies. The life time values may be stored together with the keys on the SP and the device.

Phase 2

Once a tunnel is established, and related proof keys are generated, the protocol of phase 2 is initiated and any messaging during this phase can be exchanged inside the tunnel. In this way the messaging is both encrypted and integrity-protected. It is possible, however, to perform the phase 2 messaging without the use of the tunnel One important part of phase 2 is subscriber authentication using subscriber credentials. Different alternatives and considerations for subscriber credentials will be discussed in a separate section below. For simplicity of presentation, this section uses a subscriber identity (SID) and password (SPW) as the subscriber credentials.

At this point, there are two alternatives regarding subscriber authentication:

1) Subscriber authentication may involve a challenge response mechanism. The device can initiate this phase by sending a Subscriber Authentication Request (SAR) message that includes a device-SP-ID, SP-ID, and a SAR label to SP-AAA, which in turn verifies whether the IDs in SAR match the ones from the established tunnel and sends a Subscriber Authentication Challenge (SAC) message consisting of a nonce and SP-ID to the device. The nonce is a time stamp, sequence number, or random number acting as a challenge and random input. If the SP-DAAA and SP-SAAA are separate, the tunnel may be associated with the SP-DAAA, which then needs to communicate with the SP-SAAA as appropriate. Upon receiving the SAC message, the device prompts the subscriber to enter her SID and SPW. Alternatively, the SP-AAA can initiate this phase (without receiving the SAR message), simply based on the knowledge that phase 1 is completed.

2) Subscriber authentication may involve a password-based mechanism, where no challenge is needed from the SP-AAA. Again, the device may start this phase based on a request from the SP-AAA or simply based on the knowledge that phase 1 is completed.

Using the subscriber's input (e.g., the SID and SPW and possibly any service indicators), the device can perform a set of cryptographic functions to create results for subscriber authentication as well as proof for this authentication, as shown in the following example ([ ] indicates that a field is optional and || means concatenation, the order of the fields is irrelevant):

(RES||IK)=PRF(SID, SPW, Key label, [Nonce], SP-ID, device-SP-ID, [Service_ID], [other info])

The SP-AAA (or SP-SAAA) can ensure the subscriber possesses the password (SPW) and has the identity of the SID by verifying the RES.

The IK (inner key) is essentially the proof that the subscriber is authenticated, so if the RES is verified correctly by the SP-AAA, then both the SP-AAA and the device can use the IK as a key for further cryptographic functions.

CK=PRF(TPK, IK, Key Label||SP-ID||device-SP-ID||SID|| [other info])

The CK is a compound key that is created by taking the entropy from the TPK (device authentication) and the IK (subscriber authentication) and PRF is a pseudo random function chosen for the key derivation. The compound key can be partitioned to create a number of keys:

CK=MAC key||[MSK]||[EMSK]||[other keys])

The MAC Key is used for signing the binding blob, as will be described shortly. The MSK and EMSK are optional keys, in case this protocol is wrapped into an EAP authentication method, generating a Master Session Key (MSK) and an extended Master Session Key (EMSK). Other keys such as compound tunnel resumption keys (CTRK) can be also generated from this process. The CTRK can be used later on for expediting resumption of terminated or dormant sessions.

The device now calculates a MAC key (Message Authentication Code key) that will be used for signing a BIND value. The form of the BIND may be as follows:

BIND=[SP-ID], device-SP-ID, SID, [DSP], [other info], MAC (MAC_key, [SP-ID]||device-SP-ID||SID, DSP|| [other info])

Where MAC (MAC_key, [SP-ID]||device-SP-ID||SID||DSP||[other info]) denotes a Message Authentication Code computed with the key MAC_key over the data which is a concatenation of an optional SP-ID, device-SP-ID, SID, DSP and some additional optional parameters.

Thus the BIND includes a number of attributes, such as the device identity, subscriber identity and possibly other parameters, such as a device security profile (DSP), followed by a signature (MAC) over those attributes. MAC is an acronym for Message Authentication Code, which is essentially a signature with a symmetric key over a number of attributes. The Device Security profile is an indication of the level of robustness with which the device software and/or hardware protect sensitive data and other cryptographic functions during storage, execution, or transport. This way, the BIND value provides a cryptographic proof that both the subscriber and device are authenticated with the identities that are used in the binding process.

After having made these derivations, the device sends a message consisting of (RES, BIND) to the SP-AAA (See message 5 in FIG. 2). The message is referred to as Subscriber Authentication and Binding (SAB). If EAP is used, other names/messages can be used with similar functionality. When a tunnel is in place, this message can go through the tunnel.

At this point, the robustness rules for the device and the service will generally require the device to securely erase from its memory any traces of the subscriber password (SPW) used for the generation of the RES and IK.

When separate SP-DAAA and SP-SAAA servers are implemented, the SP-DAAA receives the message through the tunnel and passes this information, together with the TPK, to the SP-SAAA, which is in charge of subscriber authentication and has the subscriber credentials to create the IK and CK and verify BIND and RES. If the two servers are collocated, the SP-AAA performs the RES and IK calculation to check the RES and CK calculation to verify BIND. If both verifications are successful, the SP-SAAA notifies the SP-DAAA about it and the SP-DAAA then creates a service token (ST) by signing the following data with its private key SP-DAAA-PrK and optionally sends the token through the tunnel.

For simplicity, from this point on it will once again be assumed that the SP-AAA server includes the functionality of both the SP-DAAA and SP-SAAA.

If the SP-AAA is aware of the device-DRM-ID, it will also include it inside the token. The token may also have a time stamp (TS), a lifetime information (ST-LT), and a multiple entitlement flag (MU), indicating how many times the device can use this token to request a service. The SP-AAA may send its public key certificate (SP-AAA-PKC) as part of the token as well for the benefit of any server that receives this token from the device. The service token thus may be specified as follows:

ST=(SP-AAA-PKC, SP-ID, SID, [SPPF-ID], device-SP-ID, [device-DRM-ID], TS, [ST-LT], [MU]), Sig(SP-DAAA-PrK, SP-ID, SID, [SPPF-ID], device-SP-ID, [device-DRM-ID], TS, [ST-LT], [MU]))

Where "Sig" denotes an asymmetric digital signature generated with the SP-AAA server's private key SP-DAAA-PrK.

Note that in some implementations the SP-AAA can add information about the service profile (SPPF-ID is the subscriber's service-profile-ID, e.g., basic 100, enhanced 200, enhanced +HBO, etc). If the SP-AAA has information about the service being requested and wants to request the token for that particular service, it can add indicators into the token about that service (i.e., the service-ID) or the servers offering the service. The token may also be encrypted if privacy is important or the SP-AAA needs to make sure only authorized application servers are using this token (for security or accounting purposes). To protect privacy, the SP-AAA may simply encrypt the token with the target server's decryption key (either a symmetric key shared with SP-AAA or target server's public key). To accomplish the second purpose (accounting, etc), the SP-AAA may encrypt the token with a key that only it has. In that case, the SP-ID or a SP-AAA ID needs to be in the clear, so that the application server knows how to send the token back to the SP-AAA for verification.

The service token ST can be used to address the problem of password sharing or password compromise by enabling the SP and/or the DRM/CAS servers to detect subscribers who make service requests from different devices at the same time and by examining the subscriber identity in the request against the number of devices that are asking for service.

At the end of phase 2, the tunnel can be torn down immediately or after the expiration of the key lifetimes (e.g. TPK-LT, CK-LT). That is, the tunnel may remain "up" after the protocol's completion. This enables multiple service tokens to be requested within the same tunnel, which may be especially desirable in environments where many subscribers use the same device (e.g. in a hotel room) or in constrained settings in which frequent tunnel establishments are not practical.

Various tunnel resumption options will be discussed below after a discussion of phase 3.

Phase 3

In general the authentication and authorization mechanism described herein can be used in connection with a service request for any type of service. For purposes of illustration only phase 3 will be described using a DRM/CAS (Digital Rights Management or Conditional Access System) server as an example.

To request content service, the device can send the token to a DRM/CAS service as part of a request (referred to herein as a Service Entitlement Request (SER) message). The message can be sent through a protected link if needed, and the protected link can be established between the device and the CAS server directly based on the credentials that the device shares with that server (e.g. device-DRM ID, key pair, cert). The request can include the title or identifier for content (content-ID), and other information related to service provider, as seen below. The device includes the service token from the SP-AAA in this request. The SER may be specified as follows:

SER=(ST, "content-ID", SP-ID, SID, device-SP-ID, device-DRM-ID)

The DRM/CAS server can verify the SER by verifying one or more of the following:
1) the source authentication of SER (if the device has signed the message or the message is sent inside a secure tunnel);
2) whether the device identities (device-SP-ID, device-DRM-ID) match;
3) the signature on ST;
4) when the MU is disabled, whether the ST has already been used in a request;
5) the device's & subscriber's authorization to view the requested content.

If all the required verifications are successful, the DRM/CAS server sends back to the device a Service Entitlement Response in accordance with the DRM/CAS specifications. The SER may contain the necessary content decryption keys.

Protocol Extensions & Features

EAP-SBTLS

In some implementations the entire protocol can be wrapped inside an EAP messaging protocol, where the first phase of the protocol is in accordance with EAP-TLS (as specified in the IETF document RFC 5216) and subscriber authentication and binding is performed inside the TLS tunnel that is created.

Tunnel Termination

As previously mentioned, maintaining the tunnel beyond a single session may sometimes be desirable. However, in some implementations it may be desirable to establish a new tunnel for each request, especially when security is a prime concern and the level of trust in the device is limited. In those cases, adding a ST confirmation message.

Session Resumption

To avoid lengthy executions of the full protocol, expedited requests may be supported so that multiple service requests can be made based on the original authentication and binding actions. Various scenarios may be implemented as follows:

Scenario 1: The ST is still valid and the multiple usage (MU) flag set. In this case the device generates a new entitlement request using an existing ST. This scenario is advantageous because it does not require any SP and subscriber interaction.

Scenario 2: The TPK has not expired. In this case the subscriber triggers Phase 2. Protocol Option 1 with challenge-response is preferable since it ensures the derivation of fresh session keys. Although interaction with the SP is required and the subscriber needs to re-enter her password, the advantage of this scenario is that no tunnel establishment is necessary.

Scenario 3: the TRK has not expired. The subscriber triggers Phase 1 and a native tunnel (TLS session) resumption mechanism is executed, i.e. the TRK is used in a secret-key based key establishment protocol to re-establish the tunnel Although interaction with the SP is required and the subscriber needs to re-enter her password, the advantage of this scenario is that the tunnel establishment process is expedited and both Protocol Options 1&2 derive fresh session keys.

Scenario 4: The CTRK has not expired. The tunnel is established as in Scenario 3. This scenario is advantageous because the subscriber is authenticated through the use of the compound key, which provides the binding in the tunnel protocol. Hence, a new service token can be requested without any additional protocol steps and the subscriber does not need to re-enter her password.

To perform a session resumption with the CTRK, the device can request what is essentially an extension of an earlier service token which is about to expire. To do this, the device can take the service token issued by the SP-AAA and encrypt it with the CTRK and optionally sign it with the same MAC key previously used to sign the binding blob:

$E_{CTRK}[ST]\|MAC(MAC-Key, E_{CTRK}[ST])$

After verifying the signature and decrypting the token, the server can verify that the device still possesses both the CTRK and the MAC Key and then extend the lifetime of the service token based on its own policies.

Password Storage

It might be undesirable in some environments to store passwords in the clear on the SP-SAAA server. In those cases the hash of the passwords can be stored instead, i.e. the SP-SAAA server stores h(SPW)/SID pairs. The protocol needs to be adjusted such that SPW is replaced by h(SPW) in all derivations and messages.

One-Time Passwords (OTP)

Regular passwords (i.e., human-memorable ones) are cryptographically weak and thus their transport often requires additional protection. Furthermore, password sharing can be a cause of revenue loss. These problems can be addressed by using one-time passwords (OTP) as a subscriber credential in place of conventional passwords. To do so, a special infrastructure needs to be in place for the distribution of OTPs, e.g. (RSA) software or a hardware token. An OTP token such as an RSA Secure ID normally includes a display of a password which changes periodically (e.g., every minute).

The SP-SAAA server needs to have access to the OTPs for each subscriber and keep track of them. No changes to the protocol are necessary. The benefits of OTPs are: robustness rules for password storage on device become unnecessary, password compromise and sharing are thwarted, and protocol Option 2 derives fresh keying material for already existing tunnels. The downside is reduced convenience for a subscriber and additional system complexity.

ID Management

As previously mentioned, it should be verified that both device identifiers (device-SP-ID and device-DRM-ID) belong to the same device. Alternative ways to accomplish this include implicit binding and explicit binding.

1. SP-based binding is provided by the protocol if both device identifiers are included in the SAB message (which is sent by device). In a more secure alternative, both identifiers in the SAB message are part of a device digital certificate. The SP-AAA Server will extract both identifiers device-SP-ID and device-DRM-ID from the SAB message and include them in a service token ST. Alternatively, the device-DRM-ID may be missing in the SAB message. However, SP servers are supplied with (device-SP-ID, device-DRM-ID) pairings out of band or beforehand, so that they can insert the device-DRM-ID into ST.

2. DRM/CAS-based binding can be achieved if the DRM/CAS knows both identities. The ST from the SP-AAA did not include the device-DRM-ID. The device re-signs the ST after including the device-DRM-ID. The signature is performed with a device private key and certificate pair that the CAS/DRM server can accept.

Alternatively, the device does not need to re-sign the ST. Instead, a DRM/CAS server is supplied with the (device-SP-ID, device-DRM-ID) pairings out of band so that it can perform the mapping on the server and authorize a subscriber based on device-SP-ID.

Another aspect of identity management may allow accounts, subscribers and devices to be tied together. In those cases in which an account is a group account (consisting of several individuals, e.g. a family), an account credential can be used instead of single user subscription credentials. In this way any group member can be assigned an individual ID/password or they can use the same account ID/password to accomplish device-account binding (instead of device-subscriber binding) and receive service. This will enable multiple group members to receive services at the same time.

EXAMPLES

Figure 3:
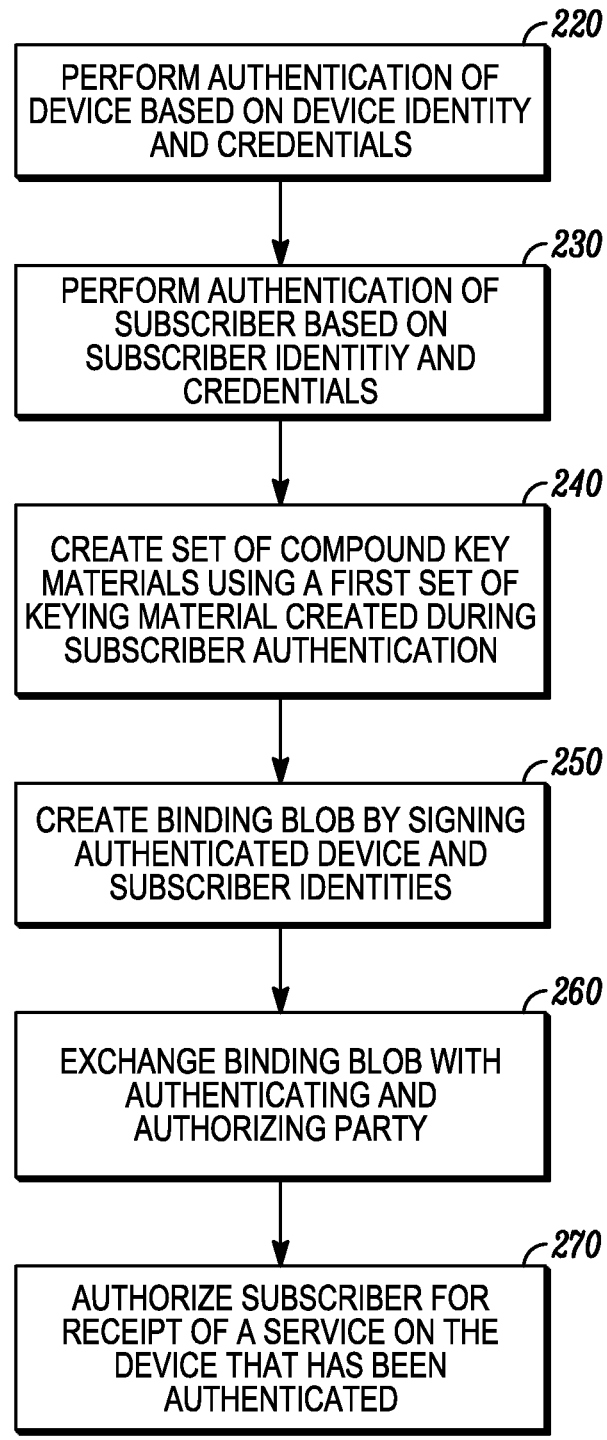
FIG. 3 shows one particular example of a method for performing authentication and authorization over a communication system.

FIG. 3 shows one particular example of a method for performing authentication and authorization over a communication system. The method starts at step 220, where a first authentication of a device is performed based on a set of device identity and credentials. The first authentication includes creation of a first set of keying material. A second authentication of a subscriber is performed in step 230. The second authentication is based on a set of subscriber identity and credentials. The second authentication includes creation of a second set of keying material. A set of compound key material is created in step 240 with a key derivation mechanism that uses the first set of keying material and the second set of keying material. A binding blob or token (e.g., BIND) is created in step 250 by cryptographically signing at least the device identity authenticated in the first authentication and the subscriber identity authenticated in the second authentication using the set of compound keying material. The signed binding blob is exchanged with an authenticating and authorizing party for verification in step 260. In some implementations the first set of keying material is used to protect the binding blob exchange. The subscriber identified by the second authentication is authorized for receipt of a service on the device identified by the first authentication in step 270.

Figure 4:
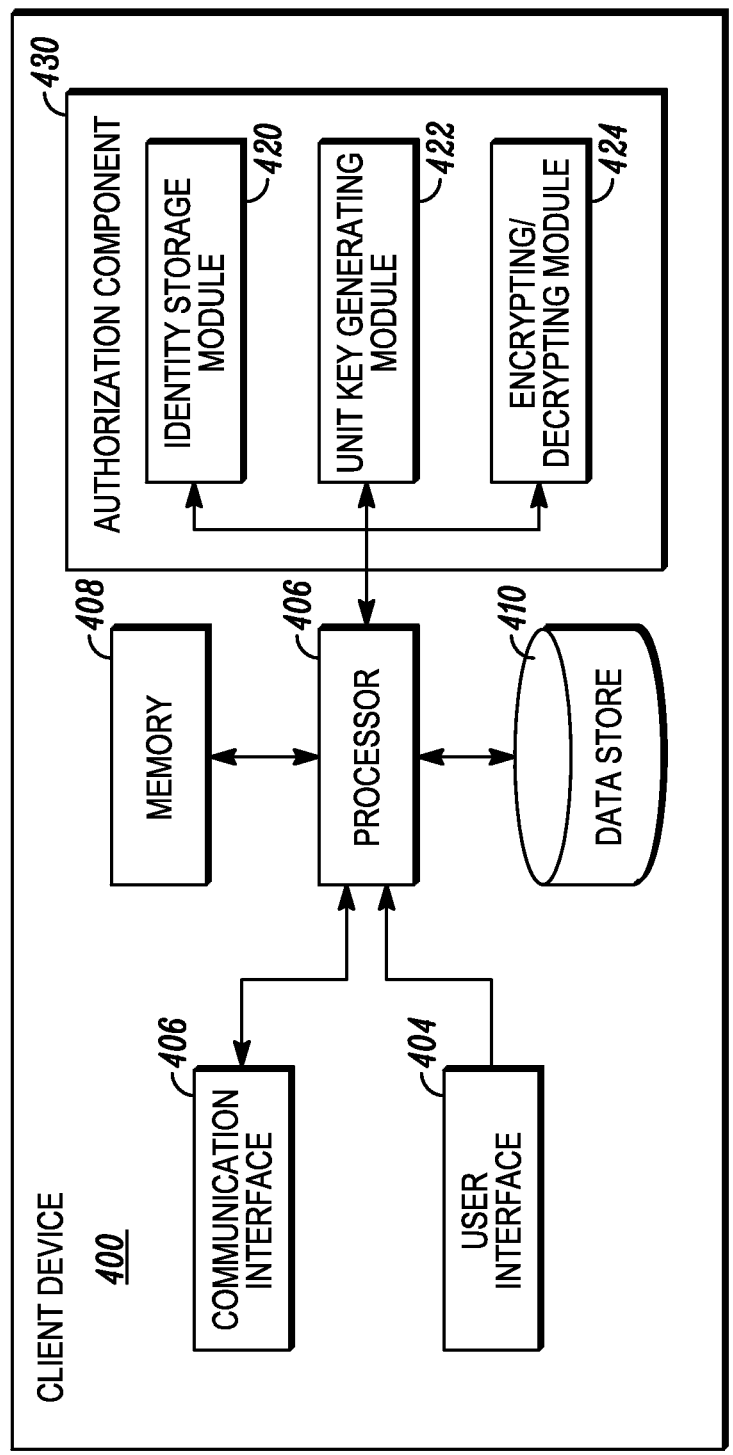
FIG. 4 shows one example of the pertinent components of a network-enabled device.

FIG. 4 shows one example of the pertinent components of a network-enabled device such as device 115 shown in FIG. 1. It should be apparent to those of ordinary skill in the art that FIG. 4 is a block diagram that represents a generalized illustration and that other components may be added or existing components may be removed, modified or rearranged. The client device 400 includes a processor 402, a user interface 404, a communication interface 406, a memory 408, a data store 410 and an authorization component 430.

The authorization component 430 performs the functionality used during the authorization and authentication process and may include, for example, such sub-components or modules as an identity storage module 420 to store cryptographic keys and digital certificates, a key generating module 422 to generate the various sets of keying material used during the process and an encryption/decryption module 424.

The modules 420-424 may comprise software modules, hardware modules, or a combination of software and hardware modules. Thus, in one embodiment, one or more of the modules 420-424 comprise circuit components. In another embodiment, one or more of the modules 420-424 comprise software code stored on a computer readable storage medium, which are executable by one of the processors 402. In a further embodiment, the modules 420-424 may comprise a combination of hardware and software. In some cases the modules 420-424 may be implemented as one more secure hardware modules that are not susceptible to tampering. In any regard, the functionalities of one or more of the modules 420-424 may be combined into a lesser number of modules 420-424 or separated into additional modules without departing from a scope of the invention.

The user interface 404 may comprise a set of keys, buttons, switches, audio transducers, displays and the like through which a user may enter inputs into the client device 440. The communication interface 406 may comprise suitable hardware and/or software to enable the client device 440 to communicate over the content delivery system.

The memory 408 and the data store 410 may comprise any reasonably suitable computer readable storage media, such as, RAM, ROM, EPROM, EEPROM, magnetic or optical disks or tapes, etc. The memory 608 may store respective programs or algorithms that define the functionalities of the processor 602. In this regard, in instances where the modules 420-424 comprise software modules, the modules 420-424 may respectively be stored as software on the memories 408. The data store 410 may store various information that the processor 402 may need in addition to the various keys available in the storage module 420.

Although various embodiments are specifically illustrated and described herein, it will be appreciated that modifications and variations of the present invention are covered by the above teachings and are within the purview of the appended claims without departing from the spirit and intended scope of the invention. For example, while the invention has been described in the context of a conditional access system, which protects content by requiring certain criteria to be met before granting access to content, the invention is also applicable to copy protection schemes, which prevents the unauthorized reproduction of content.

The invention claimed is:

1. A method of authentication and authorization over a communication system, comprising:
    performing a first authentication of a device based on a set of device identity and credentials, said first authentication including creation of a first set of keying material;
    performing a second authentication of a subscriber based on a set of subscriber identity and credentials, said second authentication including creation of a second set of keying material;
    creating a set of compound key material with a key derivation mechanism that uses the first set of keying material and the second set of keying material;
    creating a binding token by cryptographically signing at least the device identity authenticated in the first authentication and the subscriber identity authenticated in the second authentication using the set of compound keying material; and
    exchanging the signed binding token for verification with an authenticating and authorizing party.

2. The method of claim 1, further comprising using the first set of keying material to protect the second authentication of the subscriber.

3. The method of claim 1, further comprising using the first set of keying material to protect the binding token exchange.

4. The method of claim 1, wherein the device credentials are digital certificates and the first authentication is performed using Transport Layer Security (TLS) protocol.

5. The method of claim 1, wherein the binding token also includes service related attributes.

6. The method of claim 1, wherein at least one of the device authentication and the binding token includes a device security robustness profile declaration.

7. The method of claim 1, further comprising authorizing the subscriber identified by the second authentication for receipt of a service on the device identified by the first authentication.

8. The method of claim 6, further comprising rejecting any service requests received from the subscriber authenticated in the second authentication but from a second device having an identity different from the device authenticated in the first authentication.

9. The method of claim 1, wherein the compound key material includes additional key material to be used for further key derivation for further security applications.

10. The method of claim of 8 further comprising generating master session keys for derivation of application specific keys.

11. The method of claim of 8 further comprising generating session resumption keys for expediting future resumption of service for a previously authenticated subscriber and device pair.

12. The method of claim of 7 further comprising authorizing the subscriber by issuing a signed service token for consumption by at least one of the device and an external third party, wherein the signed service token includes at least one of an authenticated device identity and a subscriber identity.

13. The method of claim 12 wherein the signed service token is issued for a limited time, where a period of validity is derivable from information in the signed service token.

14. The method of claim of 12 wherein the service token is signed with an authorizing server public key so that the signed service token can be verified by third party servers.

15. The method of claim 12, wherein the signed service token includes at least one of a service identifier and a third party server identifier to limit use of the signed service token for a specific service or a specific server.

16. The method of claim 14 wherein the device identity and credentials used in the first authentication are different from the device identity and credentials used towards the third party servers and wherein the service token includes a signed version of both of the device identities.

17. The method of claim 12 wherein the signed token is sent to the device and the device also signs the service token with its own credentials understandable by the third party server.

18. The method of claim 14 where the device identity and credentials used in the first authentication are different from the device identity and credentials used towards the third party servers and a mapping of both device identities is provided to the third party servers in an out-of-band fashion.

19. The method of claim 15, wherein the signed service token includes a multiple entitlement flag indicating a number of times the token can be used to request the specific service.

20. The method of claim 12, wherein the signed service token is also encrypted with a key that is known only to an authenticating server.

21. The method of claim 12, wherein the signed service token is also encrypted with a key that is known only to a third party application server.

22. The method of claim 1, wherein at least one of the first and second authentication is performed using Extensible Authentication Protocol (EAP) messaging.

23. The method of claim 1 wherein the set of subscriber identity and credentials includes a set of group identities and credentials representing a plurality of individuals.

24. The method of claim 20 wherein each of the individuals in the group is assigned an individual identity associated with the group identity.

25. A network-enabled device for use in a communication system, comprising:
an authorization component configured to engage in a first authentication exchange to authenticate the device based on a set of device identity and credentials, and to engage in a second authentication exchange to authenticate a subscriber based on a set of subscriber identity and credentials,
the authorization component including a key generating module configured to create a first set of keying material based on the first authentication exchange, a second set of keying material based on the second authentication exchange, and a set of compound key material with a key derivation mechanism that uses the first set of keying material and the second set of keying material;
the authorization component further including an encryption module configured to create a binding token by cryptographically signing at least one of the device identity authenticated in the first authentication and the subscriber identity authenticated in the second authentication using the set of compound keying material; and
a communication interface configured to exchange the signed binding token for verification with an authenticating and authorizing party.

26. The network-enabled device of claim 25, wherein the authorization component is further configured to use the first set of keying material to protect the second authentication exchange.

27. The network-enabled device of claim 25, wherein the encryption module is further configured to use the first set of keying material to protect the binding token exchange.

28. The network-enabled device of claim 25, wherein the device credentials are digital certificates and the authorization component is further configured to perform the first authentication using Transport Layer Security (TLS) protocol.

29. The network-enabled device of claim 25, wherein the compound key material includes additional key material to be used for further key derivation for further security applications.

30. The network-enabled device of claim 25, wherein the authorization uses component EAP for authentication exchanges.

31. An authentication and authorization arrangement, comprising:
a physical device including a first authentication server configured to, in a first authentication, authenticate a device based on a set of device identity and credentials; and
a second authentication server configured to, in a second authentication, authenticate a subscriber based on a set of subscriber identity and credentials;
wherein the second authentication server is configured to verify a binding token created by cryptographically signing at least one of the device identity authenticated in the first authentication and the subscriber identity authenticated in the second authentication using a set of compound keying material derived using a first set of keying material created during authentication of the device and a second set of keying material created during authentication of the subscriber.

32. The authentication and authorization arrangement of claim 31, wherein the second authentication server is further configured to use the first set of keying material to protect the authentication of the subscriber.

33. The authentication and authorization arrangement of claim 31, wherein the second authentication server is further configured to use the first set of keying material to protect the binding token exchange.

34. The authentication and authorization arrangement of claim 31, wherein the device credentials are digital certificates and the first authentication server is configured to perform authentication using Transport Layer Security (TLS) protocol.

35. The authentication and authorization arrangement of claim 31, wherein the second authentication server is further configured to authorize the subscriber for receipt of a service on the device authenticated by the first authentication server.

36. The authentication and authorization arrangement of claim 31, wherein at least one of the first authentication server and the second authentication server is further configured to use EAP as messaging protocol.

37. The authentication and authorization arrangement of claim 35, wherein the second authentication server is further configured to reject any service requests received from the subscriber authenticated in the second authentication but from a second device having an identity different from the device authenticated in the first authentication.

38. The authentication and authorization arrangement of claim of 35 wherein the second authentication server is further configured to authorize the subscriber by issuing a signed service token for consumption by at least one of the device and an external third party, wherein the signed service token includes at least one of an authenticated device identity and a subscriber identity.

39. The authentication and authorization arrangement of claim 38 wherein the signed service token is issued for a limited time, where a period of validity is derivable from information in the signed service token.

40. The authentication and authorization arrangement of claim of 38 wherein the service token is signed with an authorizing server public key so that the signed service token can be verified by third party servers.

* * * * *